(12) United States Patent
Smith

(10) Patent No.: US 11,584,544 B2
(45) Date of Patent: Feb. 21, 2023

(54) COCKPIT ACCESS SECURITY SYSTEM

(71) Applicant: David Elias Smith, Vancouver (CA)

(72) Inventor: David Elias Smith, Vancouver (CA)

(*) Notice: Subject to any disclaimer, the term of this patent is extended or adjusted under 35 U.S.C. 154(b) by 378 days.

(21) Appl. No.: 16/795,418

(22) Filed: Feb. 19, 2020

(65) Prior Publication Data

US 2020/0317369 A1 Oct. 8, 2020

(30) Foreign Application Priority Data

Apr. 8, 2019 (CA) .............................. CA 3039453

(51) Int. Cl.
| E05B 77/00 | (2014.01) |
| B64D 45/00 | (2006.01) |
| B64C 1/14 | (2006.01) |
| E05B 77/54 | (2014.01) |
| E05B 81/64 | (2014.01) |

(52) U.S. Cl.
CPC ........ *B64D 45/0029* (2019.08); *B64C 1/1469* (2013.01); *E05B 77/54* (2013.01); *E05B 81/64* (2013.01); *E05Y 2400/44* (2013.01); *E05Y 2400/45* (2013.01); *E05Y 2900/502* (2013.01)

(58) Field of Classification Search
CPC ... B64C 1/1469; B64D 45/0029; E05B 77/12; E05B 81/64; E05B 77/54; E05Y 2400/44; E05Y 2400/45; E05Y 2900/502
See application file for complete search history.

(56) References Cited

U.S. PATENT DOCUMENTS

| 6,659,401 B1* | 12/2003 | Semprini ........... B64D 45/0029 244/129.5 |
| 6,769,646 B1* | 8/2004 | Komiyama ........... B64C 1/1469 244/129.1 |
| 6,830,217 B2* | 12/2004 | Movsesian ......... G07C 9/00896 244/129.5 |
| 6,915,986 B2 | 7/2005 | D'Alvia |
| 7,193,520 B2* | 3/2007 | Shear .................... G08B 15/02 340/945 |
| 7,376,494 B2 | 5/2008 | Arnouse |
| 8,505,850 B2 | 8/2013 | Pujol |
| 10,815,001 B2* | 10/2020 | Sarai ..................... E05B 17/005 |
| 2003/0173458 A1* | 9/2003 | Bandy .................. B64C 1/1469 244/118.5 |
| 2005/0116098 A1* | 6/2005 | Martens ............... B64C 1/1469 244/118.5 |
| 2005/0218266 A1* | 10/2005 | Bandy .................. G07C 9/0069 244/118.5 |
| 2020/0224462 A1* | 7/2020 | Renner ................... E05B 77/54 |

* cited by examiner

*Primary Examiner* — Chi Q Nguyen
(74) *Attorney, Agent, or Firm* — Smiths IP

(57) ABSTRACT

A cockpit access security system controls changes to a record of personnel authorized to access the cockpit by reference to the state of the aircraft as determined by a plurality of on-board sensors indicating the state of particular aircraft subsystems.

11 Claims, 4 Drawing Sheets

COCKPIT ACCESS SECURITY SYSTEM

FIELD OF THE INVENTION

This invention relates to relates to means of ensuring secure access to aircraft cockpits.

BACKGROUND OF THE INVENTION

Different means are known for ensuring that only authorized personnel may gain access to the cockpit from the cabin of an aircraft. Biometrically actuated locks or flight controls are known, as are passcode or card access systems (U.S. Pat. No. 7,376,494). It is also known to provide a security access system that interacts with a land-based control system to allow selective locking out of persons (see for example U.S. Pat. No. 6,915,986).

Such systems are nonetheless subject to limitations, including the possibility of hacking of the system to change the biometrics, the passcode or the passcard authorization. Hacking may be from within the aircraft or may be land-based where the security system interacts with a land-based supervisory or control system.

Restricting entry to the cockpit to authorized personnel is desirable, but it is a further object of the present invention to prevent the locking out of authorized personnel from inside the cockpit. For example, a co-pilot may seek to lock the pilot out of the cockpit in flight when the pilot leaves the cockpit temporarily, or an unauthorized person may gain access to the cockpit while passengers are boarding and lock the cockpit from the inside. Specially designated authorized personnel should typically have access regardless of whether the door has been locked from either side of the door, except in exigent circumstances.

A cockpit access security system should also accommodate changes in authorized personnel that are coincident with flight crew changes. Preferably means are provided for unregistering authorized personnel even if they are no longer present on the aircraft, as personnel may forget or omit to unregister their access authorization before leaving the aircraft. Unregistering should be fairly simple and only done in safe circumstances.

These and other objects will be better understood by reference to this application as a whole. Not all of the objects are necessarily met by all embodiments of the invention described below or by the invention defined by each of the claims.

SUMMARY OF THE INVENTION

The present invention finds application in an aircraft in which cockpit access is controlled by a lock with access codes, passes, biometrics or other forms of authorization. The invention comprises a lock controller that interfaces with one or more aircraft sensor subsystems that monitor when the aircraft is in a defined state.

The lock controller preferably operates independently of any communication with ground-based systems once the aircraft enters a secure mode (for example during flights). A record of personnel authorized to unlock the cockpit door lock is maintained. The locking system relies on that record to allow its unlocking.

The cockpit access security system according to the invention controls changes to the record of authorized personnel by reference to the state of the aircraft as determined by one or more on-board sensors indicating the state of particular aircraft subsystems. The lock controller is configured to disable any changes to the record of authorized personnel unless the appropriate on board sensor subsystems supply inputs are indicative of one or more predetermined states of the aircraft. For example, according to an embodiment, changes to the record of authorized personnel are only allowed if particular aircraft subsystems indicate both that the aircraft is on the ground and the engines are off, for example that the aircraft is "cold and dark".

Different types of changes to the record may be authorized under particular sets of conditions and states. For example, the type of change allowed may be the ability to register new authorized personnel, to clear the list of authorized personnel, to allow only limited changes to the record of authorized personnel or to configure the record to allow anyone to unlock the lock.

In an embodiment, an airline may determine that the safest and most useful condition for clearing and changing the record of authorized personnel (or of allowing anyone to access the cockpit) is when the aircraft is safe and on the ground. The subsystems that might indicate that state may include ground sensing radar, sensors detecting that there is weight on the wheels, that there is stress on the landing gear, that the airspeed is below a nominal value, that the GPS coordinates are static, that the engines are off, that the doors are open or any combination of such states or other similar subsystem outputs. Airlines can define the particular combination of state outputs that enable a change to the list/record of authorized personnel, according to the airline's procedures and protocols. For example, an airline's procedures may provide that one engine remains running while a flight crew switches out between flights. In an embodiment, changing of the list of authorized personnel or configuring the record to allow anyone to unlock the cockpit door lock is done automatically when the aircraft is in a predefined state, for example when it is cold and dark. In another embodiment, the record is automatically cleared when the aircraft is in that state or in another predetermined state (for example when the aircraft is parked and the pilot and co-pilot have left the cockpit.

Similar or different aircraft state inputs may be used to register new authorized personnel before a flight.

In an embodiment, the invention's reliance on aircraft state inputs is applied to controlling cockpit access from within the cockpit. An aircraft may provide a switch on one of the instrument panels or a latch (each hereafter referred to in this description and in the claims as an "override") that locks the cockpit door lock and overrides any authorization previously given to other personnel so as to prevent anyone from unlocking the lock from outside the cockpit, including personnel authorized in the record of authorized personnel. An airline's protocols may provide that both the pilot and co-pilot may jointly choose to activate the override to lock out all other persons from the cockpit, while not allowing either the pilot or the co-pilot alone to do so alone or to lock the other out. This can be accomplished through the present invention by a subsystem sensing that individuals are seated in both the pilot and co-pilot seats. It would be difficult for a co-pilot to fake the pressure on the pilot's seat alone. To counter the possibility of the co-pilot recruiting an accomplice to sit in the pilot's seat, an embodiment requires both state inputs indicating occupied pilot and co-pilot seats on the one hand and separate authentication of both the pilot and co-pilot from within the cockpit. That effectively verifies that the person sitting in the pilot's seat is in fact the pilot.

Accordingly, in one aspect the invention is a cockpit access security system for an aircraft, the aircraft having a cockpit door lock, the unlocking of the lock being controlled by reference to a record of personnel authorized to unlock the lock. The system comprises a lock controller, at least one on board sensor monitoring a state of a subsystem of the aircraft and providing an input to the controller representing that state. The controller is configured to authorize changes to the record only if that input is indicative of a predetermined state of the subsystem.

In another aspect of the invention, there are a plurality of on board sensors monitoring the states of a plurality of subsystems of the aircraft. The controller has at least one input representing a combination of states from the plurality of subsystems. The controller is configured to authorize changes to the record only if the at least one input is indicative of a predetermined combination of states of the subsystems. For example, the combination of states may be that the aircraft is on the ground and the aircraft engines are off. The sensors may comprise one sensor selected from the group comprising: ground sensing radar, sensor detecting that there is weight on one or more wheels, sensor detecting stress on landing gear, airspeed sensor, GPS sensor, engines on/off sensor, aircraft access door open sensor.

In an aspect, the controller may configure the record to allow anyone to unlock the cockpit door lock when the predetermined combination of states is that the aircraft is on the ground and the engines are off.

In another aspect, the invention is a cockpit access security system for an aircraft, the aircraft having a cockpit door lock, the unlocking of the lock being controlled by reference to a record of personnel authorized to unlock the lock, and a lock override operable from within the cockpit to override the record and prevent unlocking of the lock from outside the cockpit. The access security system comprises at least one on board sensor monitoring the presence within the cockpit of predetermined cockpit crew members, a controller having at least one input associated with the sensor and being indicative of whether the particular cockpit crew members are in the cockpit, and the controller being configured to authorize the override only is those cockpit crew members are in the cockpit.

In another aspect, the invention is a cockpit access security system for an aircraft, the aircraft having a cockpit door lock, the unlocking of the lock being controlled by reference to a record of personnel authorized to unlock the lock, a lock override operable from within the cockpit to override the record and prevent unlocking of the lock from outside the cockpit. The access security system comprises at least one on board sensor monitoring the presence of a person seated in the pilot's seat, at least one on board sensor monitoring the presence of a person seated in the co-pilot's seat, a controller having at least one input associated with the sensors and being indicative of whether there are both a person seated in the pilot's seat and a person seated in the co-pilot's seat. The controller is configured to authorize the triggering of the override so as to lock the cockpit door lock from inside the cockpit only if the at least one input indicates that there are both a person seated in the pilot's seat and a person seated in the co-pilot's seat. The controller may be configured to authorize the triggering of the override so as to lock the cockpit door lock from inside the cockpit only if the at least one input indicates that there are both a person seated in the pilot's seat and a person seat in the co-pilot's seat and an authentication system on board the aircraft authenticates that the persons seated in the pilot's seat and in the co-pilot's seat are the pilot and the co-pilot. In a more particular aspect, the authentication system may operate on the receipt of authentication codes from each of the person seated in the pilot's seat and the person seated in the co-pilot's seat.

In another aspect, the invention is a method of controlling access to the cockpit of an aircraft equipped with a cockpit door lock and a record of authorized personnel. The method comprises enabling changes to the record only in response to a plurality of on board sensor subsystems of the aircraft indicating that the aircraft is in a predetermined state. In a more particular aspect, the method may further comprise clearing the record automatically when the plurality of on board sensor subsystems indicate that the aircraft is in a predetermined state.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which.

DETAILED DESCRIPTION OF THE PREFERRED AND OTHER EMBODIMENTS OF THE INVENTION

Figure 1:
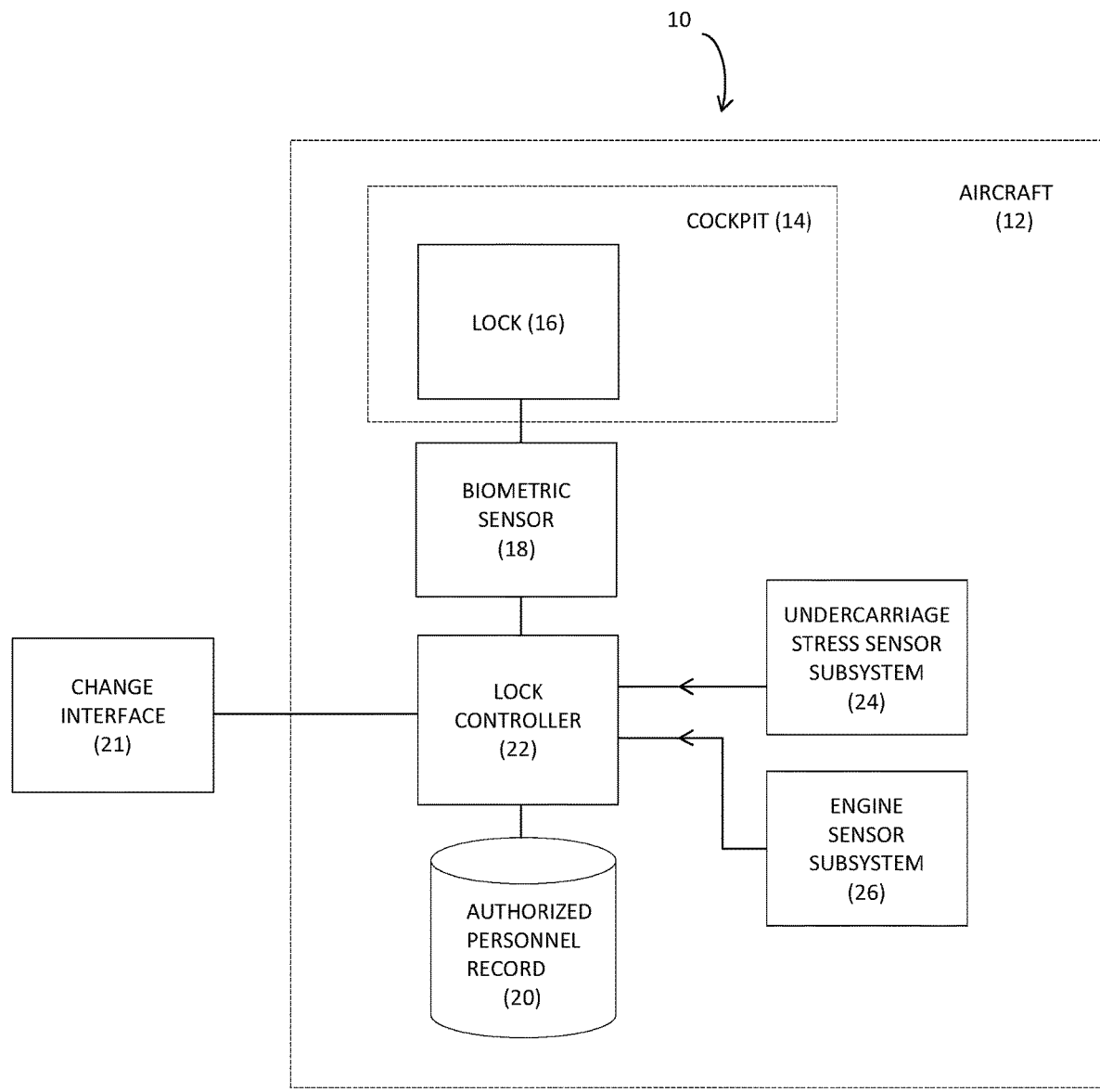
FIG. 1 illustrates the preferred embodiment of the invention.

A first embodiment of the system 10 of the invention is illustrated in FIG. 1. The system 10 is implemented entirely on board the aircraft 12.

Access to the cockpit 14 is secured by a lock 16 that is actuated by, for example, a biometric sensor 18 and a keypad. Biometric sensor 18 is in communication with a record 20 of authorized personnel to verify that the captured biometric data corresponds to an individual who is authorized for the flight in question to gain access to the cockpit 14. The lock can only be opened by reference to the record of authorized personnel and verifying that the person seeking to operate the lock is authorized to do so.

Changes to the authorized personnel record 20 are effected by a change interface 21. In FIG. 1, the change interface 21 is illustrated as not being on board the aircraft 12.

A lock controller 22 controls the ability to make any changes to the authorized personnel record 20 and therefore to the authorized personnel that are permitted to unlock the lock 16 so as to gain access to the cockpit 14. The lock controller is preferably located in a part of the aircraft that is remote from the biometric sensor 18 and from the authorized personnel record 20. In the embodiment of FIG. 1, the lock controller 22 controls the signaling between the authorized personnel record (housed in a register or a database) and the change interface 21 as shown in FIG. 1.

It is a feature of this embodiment that unless the aircraft is in a certain predetermined state, changes to the authorized personnel record are not permitted by the controller 22. Such predetermined states are detected by inputs provided to the lock controller by aircraft sensor subsystems. According to the example of this embodiment, it is desired to allow changes to the authorized personnel record only when the aircraft is on the ground and the engines are off. Accordingly, in FIG. 1 the lock controller 22 receives inputs from an undercarriage stress sensor subsystem 24 and from an engine sensor subsystem 26. The lock controller 22 is configured to enable changes to the authorized personnel record 20 only when the appropriate inputs indicate that the aircraft is on the ground with the engines off. This enables the changing of the authorized personnel record 20 for the purposes of the next flight or for access by a maintenance crew.

Rather than providing separate inputs from a plurality of sensor subsystems to the lock controller, there may instead be a separate aircraft state assessment that determines the collective state of the subsystem inputs (the combination of states of the aircraft) and that provides a single input to the controller 22 that is indicative of whether the aircraft is in the desired state to allow changes to the record.

Once the lock controller 22 enables changes to the authorized personnel record 20, such changes may be made in a conventional manner authorized by the given airline's protocols.

Figure 2:
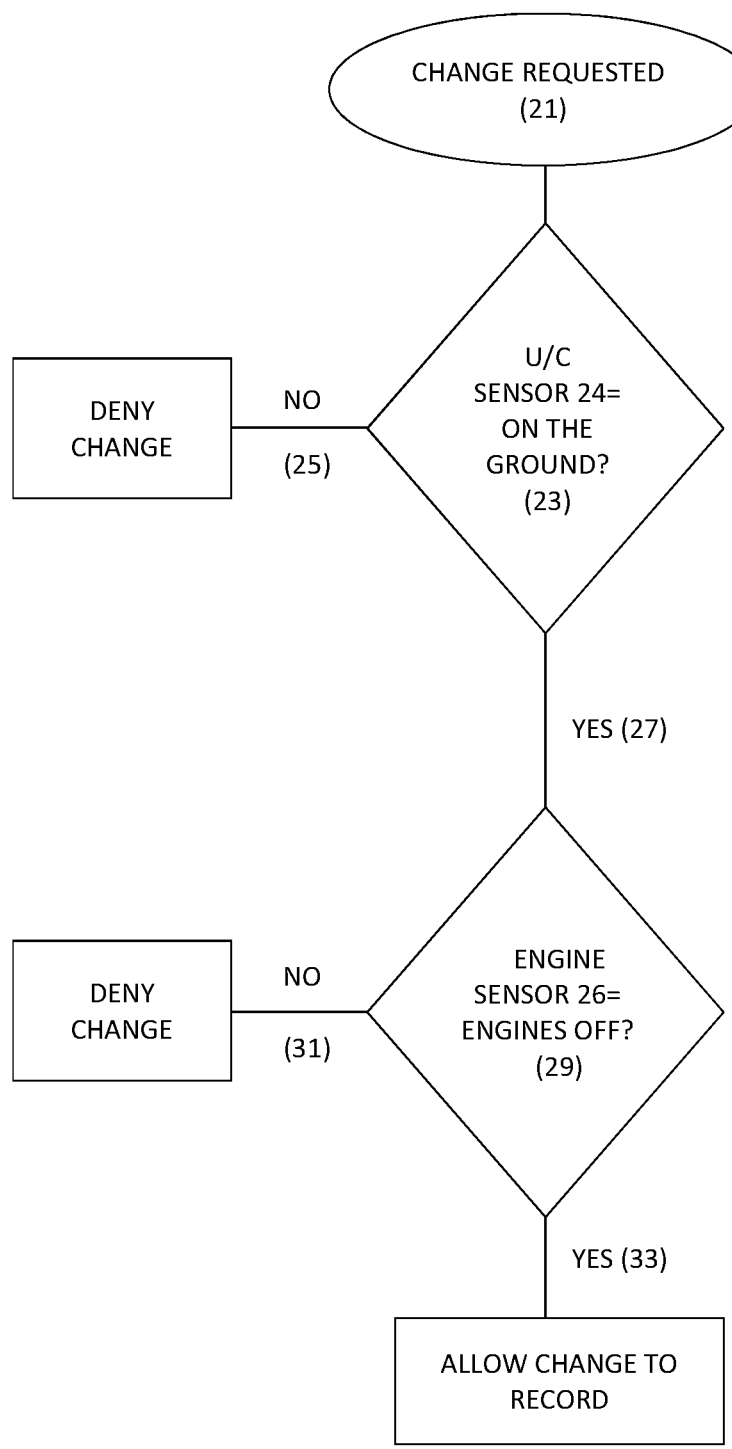
FIG. 2 is a flowchart for the preferred embodiment of the invention.

FIG. 2 is a flowchart illustrating the operation of the lock controller 22 according to the inputs received from the subsystems 24 and 26. A change request is received (21) by the controller 22. Both subsystems 24 and 26 must indicate suitable aircraft conditions before the controller 22 issues an enabling signal indicating that the authorized personnel record may be changed. The process determines (23) whether the undercarriage stress sensor 24 indicates that the aircraft is on the ground. If not (25) then the controller 22 denies the change to the record. If it does (27) then the process determines (29) whether the engines on/off sensor 26 indicates that the engines are off. If not (31) the controller denies the change to the record. If it does (33) then the controller allows the change to the record.

Figure 3:
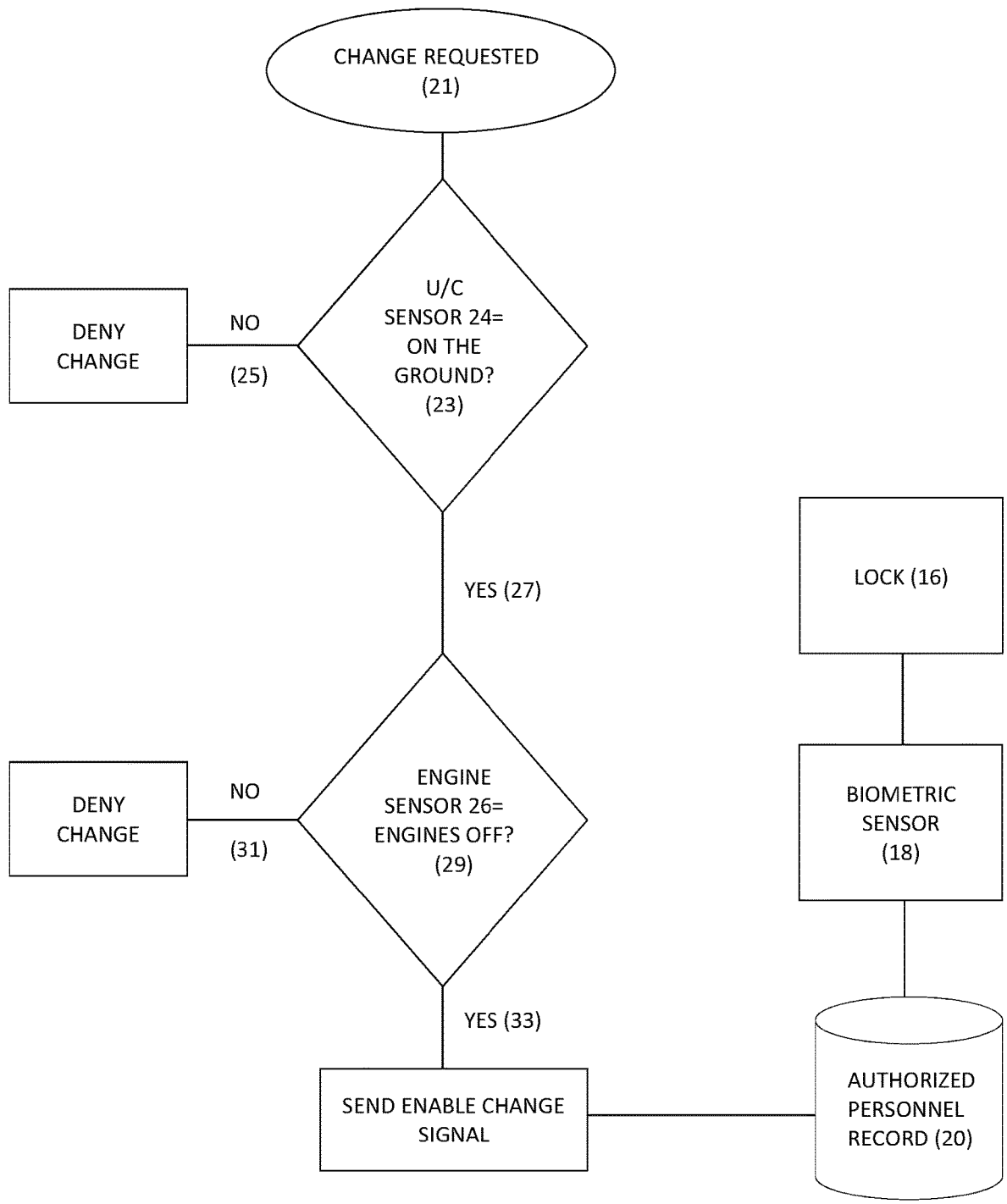
FIG. 3 illustrates an alternative embodiment of the invention.
Figure 4:
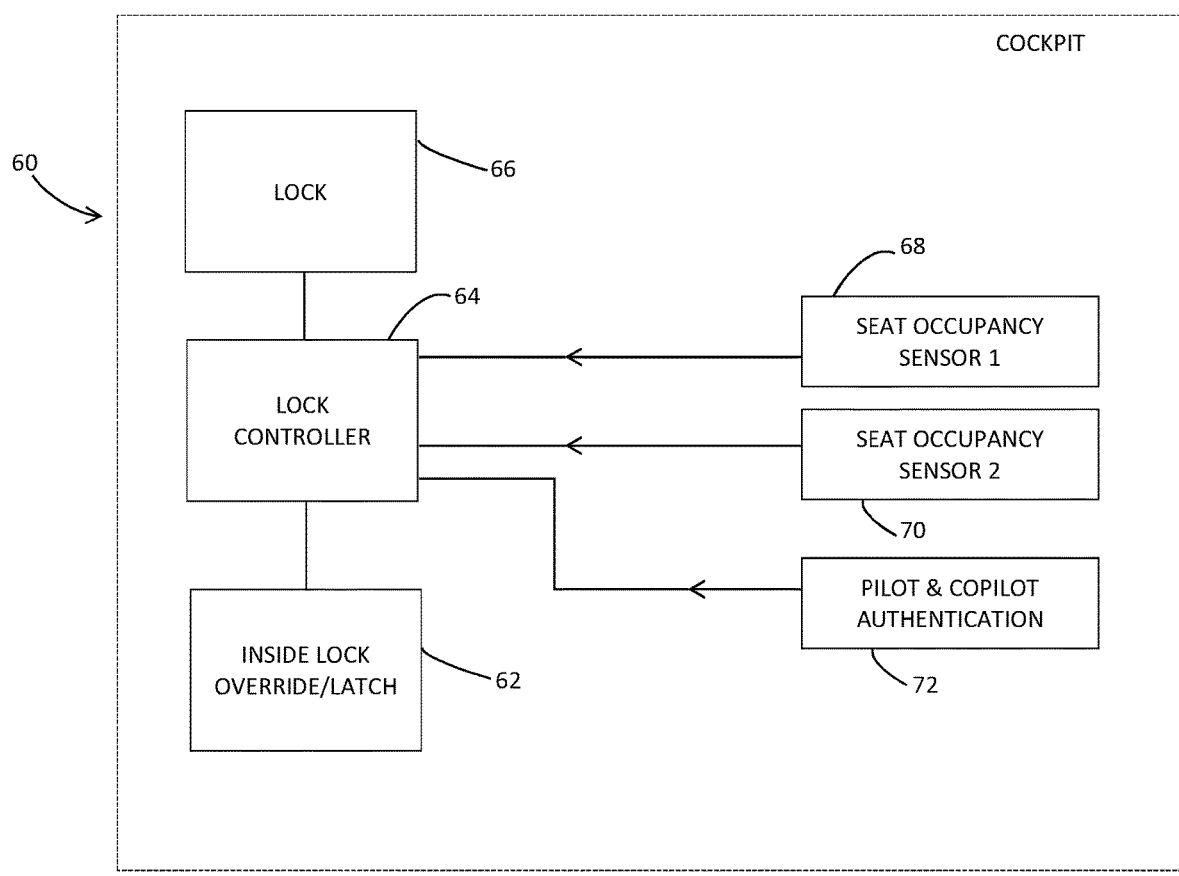
FIG. 4 illustrates an embodiment of the invention to control the locking of the cockpit door from inside the cockpit.

In an alternative embodiment shown in FIG. 3, the lock controller 22 enables the changing of the record 20 by supplying an enable signal or code from the lock controller 22 to the record 20. Preferably the authorized personnel record 20 is configured by default not to allow changes to the record unless such enable code is received from the controller 22. Instead of the controller 22 receiving and processing any request for a change, the controller 22 passively provides a suitably encoded "enable" signal to the authorized personnel database when the appropriate aircraft state or states are detected. In such embodiment, the number of inputs to the controller 22 is minimized.

According to the invention, the lock controller 22 is on board the aircraft and operates without inputs from outside the aircraft so as to minimize the risk of external hacking of the system. Preferably, the lock controller 22 further operates without any inputs except for inputs from the designated on board aircraft sensor subsystems and an input to detect a request to change the authorized personnel record.

An airline's protocols may provide that the record of authorized personnel should be automatically cleared each time the aircraft is on the ground, the engines are off and the main passenger door is open. In a corresponding embodiment, the controller receives inputs from subsystems indicating the status of each of the aircraft being on the ground, the engines being off and the main passenger door being open, and when all three states are detected, the controller automatically clears the record of authorized personnel. This may also involve configuring the record to allow anyone to unlock the cockpit door lock, and allowing changes to the record to await its repopulation by the change interface 21 with authorizations for a new flight crew. In an embodiment, the lock and the record may be controlled such that unless there are a predetermined number of persons listed in the record that are authorized to unlock the lock, the lock defaults to open and changes may be made to the record. Such arrangement is directed to ensuring that the cockpit is not inadvertently locked to all personnel by inaction in updating the record.

Rather than controlling and enabling wholesale changes to the cockpit door locking system, the invention may be used to control a specific feature of the locking system. For example, a cockpit door can usually be locked from inside the cockpit by toggling an override switch on an instrument panel or by using a cockpit door keypad to actuate a latch. Such locking overrides the ability of anyone (including the normally authorized personnel) to unlock the cockpit door lock. That capability may be subject to misuse if the pilot or co-pilot uses it to lock the other out of the cockpit during a flight.

In order to minimize the risk of the pilot or copilot locking the other out of the cockpit, in an embodiment of the invention, the lock controller allows locking of the cockpit door from the inside only if inputs are received indicating that both predetermined members of the cockpit crew (for example both the pilot and the copilot) are present in the cockpit. Referring to FIG. 3, a system 60 for locking the cockpit door from inside the cockpit consists of an override one of the instrument panels or a cockpit door keypad actuating a latch (62). The lock controller 64 interfaces with the lock 66 to prevent actuation of the lock 66 unless an appropriate set of sensor inputs are received by the lock controller. Seat occupancy sensors 68, 70 (for example pressure sensors) provide inputs to the lock controller 64 indicating whether there is occupancy pressure on the pilot and copilot seats respectively. If the sensor inputs indicate that both seats are occupied, the lock controller 64 authorizes the passage of the lock instruction to the lock 66. This embodiment therefore requires that both the pilot's seat and the co-pilot's seat be occupied in order to allow the locking of the cockpit door lock from inside the cockpit.

In a variation on the embodiment, identity authentication is also required of the pilot and copilot in combination with inputs indicating that their seats are occupied. An authentication subsystem 72, such as an ID code keypad or a biometric sensor are preferably provided on the instrument panel. The lock controller 64 receives an input from the subsystem 72 indicating that the code is being entered by the corresponding officer. The lock controller 64 only enables actuation of the cockpit door lock 66 if both seat occupancy sensors 68, 70 indicate that the seats are occupied and the appropriate identification inputs are received for both the pilot and copilot.

Variations on the lock authorization protocols may of course be contemplated.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. A cockpit access security system for an aircraft, the aircraft having a cockpit door lock, unlocking of said lock being controlled by reference to a record of personnel authorized to unlock the lock, said access security system comprising:
   a lock controller;
   at least one on board sensor monitoring a state of a subsystem of said aircraft and providing an input to said controller representing said state; and,
   said lock controller configured to authorize changes to said record only if said input is indicative of a predetermined state of said subsystem.

2. The cockpit access security system of claim 1 wherein said at least one on board sensor comprises a plurality of on board sensors monitoring the states of a plurality of subsystems of said aircraft; and,
   said lock controller having at least one input representing a combination of states from said plurality of subsystems; and,
   said lock controller configured to authorize changes to said record only if said at least one input is indicative of a predetermined combination of states of said subsystems.

3. The cockpit access security system of claim 2 wherein said combination of states are that the aircraft is on the ground and the aircraft engines are off.

4. The cockpit access security system of claim 2 wherein said sensors comprise one sensor selected from the group comprising: ground sensing radar, sensor detecting that there is weight on one or more wheels, sensor detecting stress on landing gear, airspeed sensor, GPS sensor, a sensor sensing whether engines are ON or OFF, aircraft access door open sensor.

5. The cockpit access security system of claim 2 wherein said lock controller configures said record to allow anyone to unlock the cockpit door lock upon said predetermined combination of states beings that the aircraft is on the ground and the engines are off.

6. A cockpit access security system for an aircraft, the aircraft having a cockpit door lock, unlocking of said cockpit door lock being controlled by reference to a record of personnel authorized to unlock the lock, and a lock override operable from within a cockpit to override said record and prevent unlocking of said lock from outside the cockpit, said access security system comprising:
   at least one on board sensor monitoring the presence within the cockpit of predetermined cockpit crew members;
   a controller having at least one input associated with said sensor, said input being indicative of whether said predetermined cockpit crew members are present within the cockpit; and,
   said controller configured to authorize said override only is said predetermined cockpit crew members are within the cockpit.

7. A cockpit access security system as in claim 6 further comprising:
   at least a first on board sensor monitoring the presence of a person seated in the pilot's seat;
   at least a second on board sensor monitoring the presence of a person seated in the co-pilot's seat;
   said controller having at least one input associated with said first and second sensors, said at least one input being indicative of whether there are both a person seated in the pilot's seat and a person seated in the co-pilot's seat; and,
   said controller configured to authorize the triggering of said override so as to lock the cockpit door lock from inside the cockpit only if said at least one input indicates that there are both a person seated in the pilot's seat and a person seated in the co-pilot's seat.

8. The cockpit access security system of claim 7 wherein said controller is configured to authorize the triggering of said override so as to lock the cockpit door lock from inside the cockpit only if:
   said at least one input indicates that there are both a person seated in the pilot's seat and a person seat in the co-pilot's seat; and,
   an authentication system on board the aircraft authenticates that the persons seated in the pilot's seat and in the co-pilot's seat are the pilot and the co-pilot.

9. The cockpit access security system of claim 8 wherein the authentication system operates on the receipt of authentication codes from each of the person seated in the pilot's seat and the person seated in the co-pilot's seat.

10. A method of controlling access to a cockpit of an aircraft equipped with a cockpit door lock and a record of authorized personnel, comprising:
    enabling changes to said record only in response to a plurality of on board sensor subsystems of said aircraft indicating that said aircraft is in a predetermined state.

11. The method of claim 10 further comprising clearing said record automatically upon said plurality of on board sensor subsystems indicating, that said aircraft is in a predetermined state.

* * * * *